W. & J. T. BIRD.
Dried Beef and Vegetable Cutter.

No. 51,288. Patented Dec. 5, 1865.

WITNESSES: INVENTOR.

UNITED STATES PATENT OFFICE.

W. BIRD AND JOSEPH T. BIRD, OF FLEMINGTON, NEW JERSEY.

DRIED-BEEF AND VEGETABLE CUTTER.

Specification forming part of Letters Patent No. 51,288, dated December 5, 1865.

*To all whom it may concern:*

Be it known that we, W. BIRD and J. T. BIRD, of Flemington, in the county of Hunterdon and State of New Jersey, have invented a new and Improved Cutter for Dried Beef, Vegetables, &c.; and we do hereby declare that the following is a full, clear, and exact description thereof, which will enable others skilled in the art to make and use the same, reference being had to the accompanying drawings, forming part of this specification, in which—

Figure 1:
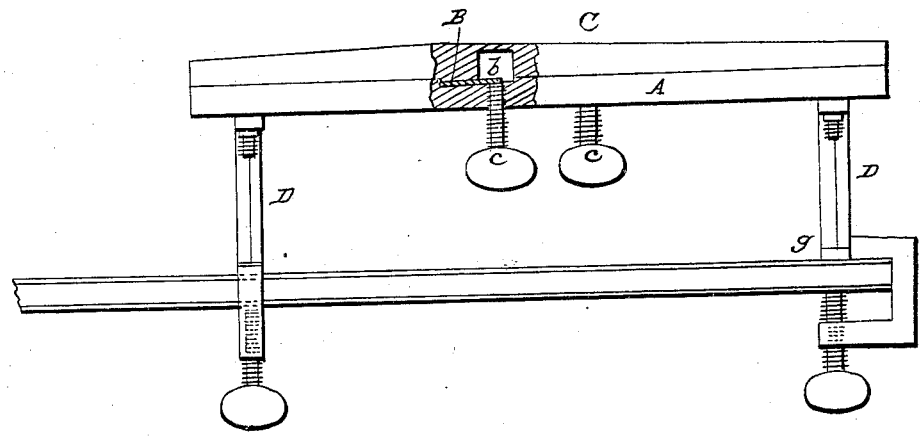
Figure 2:
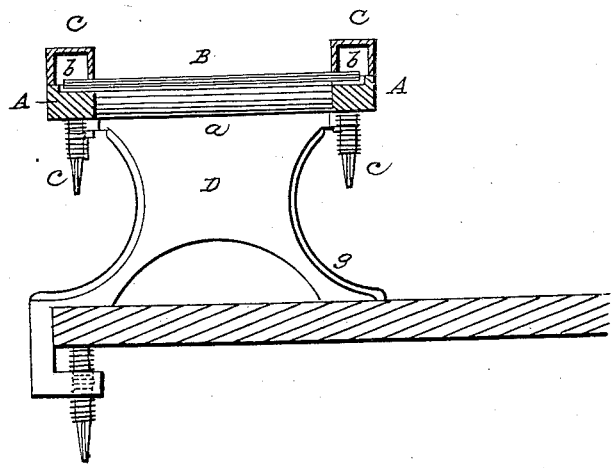

Figure 1 represents a sectional side elevation of this invention. Fig. 2 is a transverse section of the same.

Similar letters of reference indicate like parts.

This invention relates to a device which is intended particularly for cutting dried beef, but which can also be used for cutting vegetables, such as potatoes, cucumbers, beets, &c. It is provided with two angular screw-clamps, which are provided with supporting-legs, and so shaped and situated that by their aid the cutter can be readily and conveniently secured to the corner of a table, and a dish or plate can be put under it to receive the cut articles. The cutter is subjected to the action of springs from above and of set-screws from below. By turning the set-screw the knife is adjusted to cut coarser or finer, and the operation of adjusting is rendered easy. The cutting-edge of the knife can also be set so as to be lower at one end than at the other, and thereby the use of two or more knives in one and the same board is rendered feasible.

A represents a board, which is provided with an oblique slot, *a*, extending transversely across the same at about the middle of its length. This slot is intended to let the cut articles pass down, and it forms the throat of the cutter. Over it is situated the knife B, the ends of which extend under strips C, that are firmly secured to the board A, close to its edges, by screws or any other suitable means. Said strips are provided with cavities on their inner sides to receive springs *b*, of india-rubber or other suitable material, which bear upon the upper surface of the knife and have a tendency to depress the cutting-edge of the same.

Set-screws *c*, which are screwed into the board, A from below, serve to adjust the cutting-edge so as to cut coarser or finer, as may be desired. Only one screw is to be turned on each end of the knife, and the strips C are not liable to be forced off or split, as is the case when two screws are used on each end of the knife, one from above and the other from below. The springs permit also to adjust the cutting-edge somewhat lower at one end than at the other without straining the knife or strips, and thereby the choking of the cutter is avoided; and furthermore, if desired, two or more knives can be readily adjusted one over the other.

The board A is furnished with two screw-clamps, D, which are provided with supporting-legs *g*, and which are so situated that they permit of attaching the cutter securely to the corner of a table, as shown in Fig. 1 of the drawings, in a convenient position for operation, and so that a dish or plate can be put under it to receive the cut articles. The legs *g* support the cutter and prevent it from working loose during the operation of cutting.

The whole device is simple in its construction. It is durable, very convenient, and easily operated.

We claim as new and desire to secure by Letters Patent—

The relative arrangement of the knife B, springs *b b*, and set-screws *c c*, the ends of the knife being interposed between the set-screws and springs, and the whole employed in connection with the table A and strips C C, in the manner and for the purposes specified.

The above specification of our invention signed by us the 30th June and July, 1865, respectively.

W. BIRD.
JOSEPH T. BIRD.

Witnesses for W. Bird:
M. M. LIVINGSTON,
C. L. TOPLIFF.

Witnesses for Jos. T. Bird:
ROBERT J. KILLGORE,
JNO. S. EMERY.